Jan. 24, 1933.  A. L. NELSON ET AL  1,895,171
AUTOMOBILE BODY SILL
Filed Oct. 26, 1931
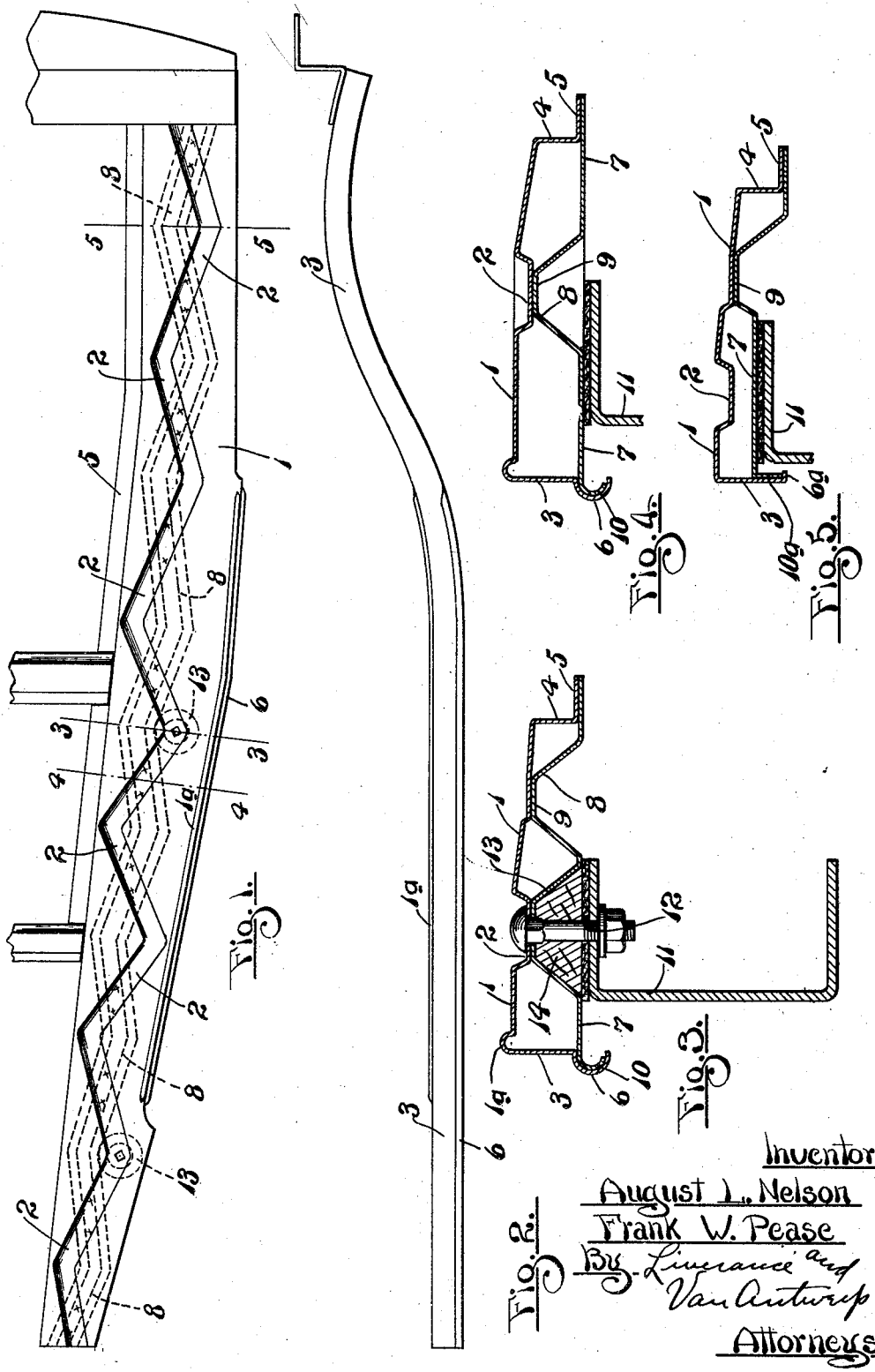
Inventors
August L. Nelson
Frank W. Pease
By Liverance and
Van Antwerp
Attorneys Patented Jan. 24, 1933

1,895,171

UNITED STATES PATENT OFFICE

AUGUST L. NELSON AND FRANK W. PEASE, OF GRAND RAPIDS, MICHIGAN, ASSIGNORS TO HAYES BODY CORPORATION, OF GRAND RAPIDS, MICHIGAN, A CORPORATION OF MICHIGAN

AUTOMOBILE BODY SILL

Application filed October 26, 1931. Serial No. 571,015.

This invention relates to an automobile body sill. In the construction of automobile bodies it is desirable to make use of metal as far as possible, eliminating wood and substituting metal in place thereof. The sills of automobile bodies have previously been made to a large extent of wood and where there has been a substitution of metal the construction has been heavy and comparatively cumbersome in order that the necessary strength which the sill must have shall not be lessened.

In the present invention it is a primary object and purpose to build an automobile body sill entirely of sheet metal, and so construct and reinforce the same that a very strong and rigid sill may be obtained and at the same time the construction be materially lightened in weight and thinner and lighter gauges of metal used.

An understanding of the invention for the attainment of the ends stated may be had from the following description, taken in connection with the accompanying drawing, in which, Fig. 1 is a fragmentary plan view of a side of an automobile body frame, the sill of our construction being shown fully in plan.

Fig. 2 is a side elevation of the sill, and

Figs. 3, 4 and 5 are enlarged transverse cross sections on the planes of lines 3—3, 4—4 and 5—5, respectively, of Fig. 1.

Like reference characters refer to like parts in the different figures of the drawing.

In the construction of the sill an upper plate 1 of sheet metal is provided, which is formed lengthwise thereof with a continuous trough or depression of zigzag form as shown. The trough or depression 2 is made up of a series of relatively short sections located at an angle to each other, as best shown in Fig. 1, and providing corners where the ends of any two sections meet.

At each side edge the plate 1 is formed with a downturned flange, the flange 3 shown in Figs. 3, 4 and 5 at the outer side, and the flange 4 at the inner side of the sill; and for a portion at least of its length the flange 4 is provided with an outturned horizontal terminal flange 5. The upper plate 1 for a part of its length may be formed with an upwardly pressed bead 1a at the corner where it joins with the downturned flange 3, and the lower edge of the flange 3 may be formed into a semi-cylindrical roll or bead 6 for a part of its length, and for the remainder have an inturned lip 6a as shown in Fig. 5, the beads at 1a and 6 being at an intermediate portion in the length of the sill and associated with the door openings in the body.

The sill is completed by an underplate 7 of sheet metal which similarly is formed with a continuous upwardly extending trough or depression 8 in its length, made up of zigzag sections as best shown in dotted lines in Fig. 1. The top 9 of the trough 8 contacts and bears against the under sides of the bottoms of the trough sections 2 where the sections of the same cross each other. At said contacting points the metal is permanently secured together preferably by spot welding. In addition the inner edge portions of the bottom plate 7 of the sill extend under the horizontal flanges 5 in contacting engagement therewith and the same are spot welded together, while at the outer edge, in conjunction with the bead 6 described, the plate 7 is formed with a bead 10 of smaller radius fitting into the bead 6 and the same secured together by welding; while at those portions of the length of the sill where the flange 3 extends straight down, as shown in Fig. 5, the plate 7 terminates in a downwardly extending flange 10a bearing against the flange 3, said flanges being permanently secured together as by spot welding.

Sills in automobile bodies lie upon the upper flanges of the chassis frame members which ordinarily are of channel shape, as shown at 11 in Fig. 3. A suitable intermediate cushion or bearing member is disposed between the upper side of the upper flange of the chassis frame member 11 and the sill and bolts 12 are passed downwardly through the sill at spaced intervals and through the upper flange of the chassis member. The heads of the bolts seat in the trough or depression 2 at a corner made by a juncture of two of the angular sections; and where a bolt is passed through the sill, the underplate 7 is formed with a frusto-conical depression 13 the top of which bears against the underside of the trough 2. This depression is filled with a frusto-conical block 14 of wood, rubber or other suitable material as shown, in Fig. 3.

The construction described is one of exceptional strength and rigidity for a lightness of the material which may be used. The crossing zigzag sections of troughs or depressions in the upper and lower plates of sheet metal from which the sill is made, and their fastening at their contact points where the sections of the zigzag troughs cross each other together, with the permanently securing of the edges of the upper and lower plates together make a particularly practical and efficient sill construction. The invention is defined in the appended claims and is to be considered comprehensive of all forms of structure coming within their scope.

We claim:

1. A sill including upper and lower parallel sheet metal plates, said upper plate having a longitudinal downwardly extending trough therein of zigzag form, and the lower plate having a longitudinally extending upwardly pressed trough of zigzag form, the inner portions or bottoms of said troughs crossing and contacting with each other at spaced apart points and having permanent connection together.

2. A sill of the class described comprising, an upper plate of sheet metal formed longitudinally thereof with a downwardly pressed trough having consecutive sections thereof disposed at angles to each other, a lower plate of sheet metal located under said upper plate and parallel thereto and formed with a longitudinally upwardly extending trough having contiguous sections located at an angle to each other, said sections of the troughs in the upper and lower plates crossing each other at a plurality of spaced apart points and contacting with each other whereby the same may be permanently secured together.

3. A construction containing the elements in combination defined in claim 2, said upper plate at its side edges having downwardly extending flanges, and means connecting said flanges at their lower portions with the under plate.

4. A construction containing the elements in combination defined in claim 2, combined with upwardly extending recesses pressed in the lower plate at spaced apart intervals directly below angles of the zigzag trough in the upper plate, the upper part of the metal of said recesses in said lower plate bearing against the bottoms of said trough in the upper plate at said angles.

5. A sill comprising, upper and lower plates of sheet metal spaced from each other and connected at their longitudinal edges, said plates having continuous reinforcing trough-like depressions formed in said upper and lower plates extending toward each other, said depressions being of zigzag form and crossing each other at a plurality of points in the length of the plates, and having contacting portions permanently secured together.

In testimony whereof we affix our signatures.

AUGUST L. NELSON.
FRANK W. PEASE.